(12) United States Patent
Tajima et al.

(10) Patent No.: US 7,032,044 B2
(45) Date of Patent: Apr. 18, 2006

(54) AV DEVICES AND METHOD OF CONTROLLING THE SAME

(75) Inventors: Teruo Tajima, Ome (JP); Motohiro Suzuki, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 306 days.

(21) Appl. No.: 10/388,159

(22) Filed: Mar. 14, 2003

(65) Prior Publication Data

US 2003/0177244 A1    Sep. 18, 2003

(30) Foreign Application Priority Data

Mar. 15, 2002    (JP) .............................. 2002-073016

(51) Int. Cl.
*G06F 13/00* (2006.01)

(52) U.S. Cl. ...................... 710/100; 710/105; 710/108; 710/110; 710/305

(58) Field of Classification Search ................ 710/100, 710/104, 105, 108–110, 305
See application file for complete search history.

(56) References Cited

U.S. PATENT DOCUMENTS

| | | |
|---|---|---|
| 6,073,006 A | 6/2000 | Sawyer et al. |
| 6,304,637 B1 | 10/2001 | Mirashrafi et al. |
| 2002/0054344 A1 | 5/2002 | Tateyama |
| 2003/0070015 A1* | 4/2003 | Brelin ........................ 710/100 |

FOREIGN PATENT DOCUMENTS

| | | |
|---|---|---|
| EP | 1 061 707 A2 | 12/2000 |
| JP | 7-38579 | 2/1995 |
| JP | 11-355329 | 12/1999 |
| JP | 2002-16607 A | 1/2000 |
| JP | 2000-124928 | 4/2000 |
| JP | 2000-358032 A | 12/2000 |
| JP | 2002-74350 A | 3/2002 |
| WO | 02/21841 A1 | 3/2002 |

OTHER PUBLICATIONS

Firewire—the Consumer Electronics Connection.*
Fire on the Wire, The IEEE 1934 High Performance Serial Bus.*
Fundamentals of Firewire.*
Consumer Audio/Video Equipment-Digital Interface.*
Japanese Office Action, dated Jul. 27, 2004 for Application No. 2002-073016.

* cited by examiner

*Primary Examiner*—Khanh Dang
(74) *Attorney, Agent, or Firm*—Pillsbury Winthrop Shaw Pittman, LLP (57) ABSTRACT

In AV deices connected to a network via a digital interface, a connection request given from the outside via the network is rejected within a preset time after a connection state of the network changes.

16 Claims, 11 Drawing Sheets

FIG. 3A Before bus reset occurs

FIG. 3B After bus reset occurs

FIG. 3C

FIG. 4A Before bus reset occurs

After bus reset occurs

FIG. 4B
READ request of iPCR

LOCK request to iPCR using channel number 32ch

FIG. 4C
Argument value = iPCR value read
LOCK fails because the argument value designated by STB is different from the complete iPCR value sent from D-VHS 14.

LOCK request to iPCR using channel number 32ch

FIG. 4D
Argument value = iPCR value obtained from LOCK response
LOCK succeeds because the argument value designated by STB is equal to the complete iPCR value sent from D-VHS 14.

AV DEVICES AND METHOD OF CONTROLLING THE SAME

CROSS-REFERENCE TO RELATED APPLICATIONS

This application is based upon and claims the benefit of priority from the prior Japanese Patent Application No. 2002-073016, filed Mar. 15, 2002, the entire contents of which are incorporated herein by reference.

BACKGROUND OF THE INVENTION

1. Field of the Invention

The present invention relates to AV (Audio Video) devices connected to a network handling Audio and Video signals, such as typified by digital interfaces conformable to IEEE (the Institute of Electrical and Electronics Engineers, inc.) 1394 standard, and to a method of controlling the AV devices.

2. Description of the Related Art

As recently known, by using a serial bus with a digital interface compliant with IEEE 1394 standard, it is possible to build up a network system in which a plurality of AV devices are connected in an arbitrary manner.

In particular, the above IEEE 1394 serial bus is used as a digital interface between digital broadcasting receivers such as an STB (Set Top Box) and digital recording/reproducing devices such as D-VHS (Digital-Video Home System) systems. This serves to build up a high definition recording/reproducing system.

When carrying out digital recording from an STB to a D-VHS device using the above IEEE 1394 serial bus, connection is made in the following manner.

(1) The STB secures isochronous CH (Channel) with respect to IRM (Isochronous Resource Manager).

(2) The STB secures isochronous bandwidth with respect to the IRM.

(3) Logical connection (new connection) between oPCR (output Plug Control Register, output logical plug) of the STB and iPCR (output Plug Control Register, input logical plug) of the D-VHS device.

(4) The STB starts isochronous transmission of MPEG [Moving Picture Experts Group] (partial TS: Partial Transport Stream) from the STB. By doing so, MPEG data is transmitted to the D-VHS device.

(5) The STB requests AV (Audio Video)/C (Control) command to the D-VHS device.

(6) The D-VHS device starts recording while making logical connection (Overlay connection) between the oPCR of the STB and the iPCR of the D-VHS device.

The overlay connection is not essential process. By contrast, the logical connection cannot be opened by any devices other than one that has achieved it. When the device opens a logical connection, a D-VHS digital recording/reproducing device, for example, which is operating in association with this device, fails to perform stable data recording. To prevent this, the D-VHS device achieves logical connection as an overlay connection.

By doing so, when recording by the D-VHS device is carried out, the logical connection from the D-VHS device still remains even if the connection with the partner device is opened; therefore, stable isochronous transmission can continue, and as a result, the recording operation can be stably continued.

After steps (1) to (6) are carried out, the user may designate only a desired part of the program. Then, steps (1) to (6) will be performed in the reverse order. Namely, the following steps will be performed in sequence:

(1) The STB requests an AV/C command (stop operation) with respect to the D-VHS device.

(2) The D-VHS device completes recording while opening a logical connection (Overlay connection) between the oPCR of the STB and the iPCR of the D-VHS device.

(3) The STB stops isochronous transmission of MPEG (partial TS).

(4) The logical connection between the oPCR of the STB and the iPCR of the D-VHS device is opened or eliminated. The next process is carried out.

(5) The STB returns the isochronous bandwidth to the IRM.

(6) The STB returns the isochronous CH to the IRM.

During the recording operation, when users make the operations such as device expansion (addition) and separation (deletion) from the bus, bus reset occurs in the IEEE 1394 serial bus. The bus reset is a standardized function for detecting a change (i.e., change of connection tree structure, herein) of network topology in IEEE 1394 and transmitting it to devices on the network.

When the above bus reset occurs, it is possible to acquire node information of a new bus within a specified time, that is, time (about one second) defined by isoch_resource_delay, and to continue isochronous transmission.

Namely, the connection is not slowly restored over a very long time. For example, if two networks are connected via cable, one network is newly built up. However, when two networks before being connected use the same logical channel independently from each other, transmission data collides after connection.

If the above-mentioned disadvantage is continued, the problem arises. For this reason, there is a need for limiting the connection restore so that it can be completed within a predetermined time. Alternatively, there is a need for stopping transmission once and restarting the transmission after a new logical channel is secured.

For data, such as AV stream, which should be continuously transmitted, the connection should be restored within a predetermined time. In IEEE 1394 networks, the predetermined time is defined as isoch_resource_delay.

According to the above connection restore, there is no assurance that isochronous transmission is always continuously secured without being disconnected. For this reason, the instruction manual for a device states the following warning message: "Do not plug in and out cable during recording even if the device is an unnecessary device."

However, the IEEE 1394 serial bus makes high-speed digital communication from 100 Mbps (Mega bits per second) to 400 Mbps; for this reason, it is inevitably influenced by external noise. As a result, bus reset occurs even if users do not intentionally expand or reduce the number of devices on the network. Thus, it is difficult to fully eliminate the influence of noise, and to specify the noise source by user.

After the bus reset occurs, unless connection is restored within the time defined by the above isoch_resource_delay, that is, if reconnection fails, the connection relationship on a network made so far becomes invalid, and a new network is built up.

For this reason, the following problem arises. In the above procedure, that is, in a state that the STB carries out digital recording with respect to the D-VHS device, bus reset occurs and reconnection fails. In this case, the STB cannot carry out digital recording with respect to the D-VHS device until reset is made on a new network.

There are some reasons why the reconnection cannot be achieved. First, the node information is not acquired within a limited time because the time required to acquire the information differs according to the type of the device or the timing of data acquisition. Second, two or more devices request for the IRM resource at the same time.

As described above, under the present circumstances, when bus reset occurs during a recording operation and reconnection fails, a problem arises such that recording is interrupted.

JPN. PAT. APPLN. KOKAI Publication No. 11-355329 discloses the following technique. According to the technique, if a relatively lengthy bus-reset occurs, data read or write to a recording medium is temporarily stopped while synchronous packet transmission is interrupted. By doing so, it is possible to prevent transmission data error and the generation of a non-recording portion.

JPN. PAT. APPLN. KOKAI Publication No. 2000-124928 discloses the following technique. According to the technique, several information transmission systems transmitting information under the IEEE 1394 standard are mutually connected, and thereby, a new information transmission system is formed. Even if bus reset occurs in the entirety of the new information transmission system, information transfer is normally carried out between at least two nodes after the bus reset.

However, the above KOKAI Publications have no description relative to suitable steps for interruption of information transmission when bus-reset occurs during a recording operation and reconnection fails, as described above.

BRIEF SUMMARY OF THE INVENTION

It is an embodiment of the present invention to provide AV devices, which can continue the preceding connection state even if the network connection state changes, so that a recording operation is not affected, and to provide a method of controlling the AV devices.

According to one aspect of the present invention, there is provided an AV device comprising:

a digital interface section configured to make a connection with a network; and a control section configured to reject a connection request given from the outside via the network within a preset time after a connection state of the network changes.

According to one aspect of the present invention, there is provided a method of controlling an AV device, comprising:

controlling AV devices connected to a network via a digital interface so as to reject a connection request given from the outside via the network within a preset time after a connection state of the network changes.

DETAILED DESCRIPTION OF THE INVENTION

Figure 1A:
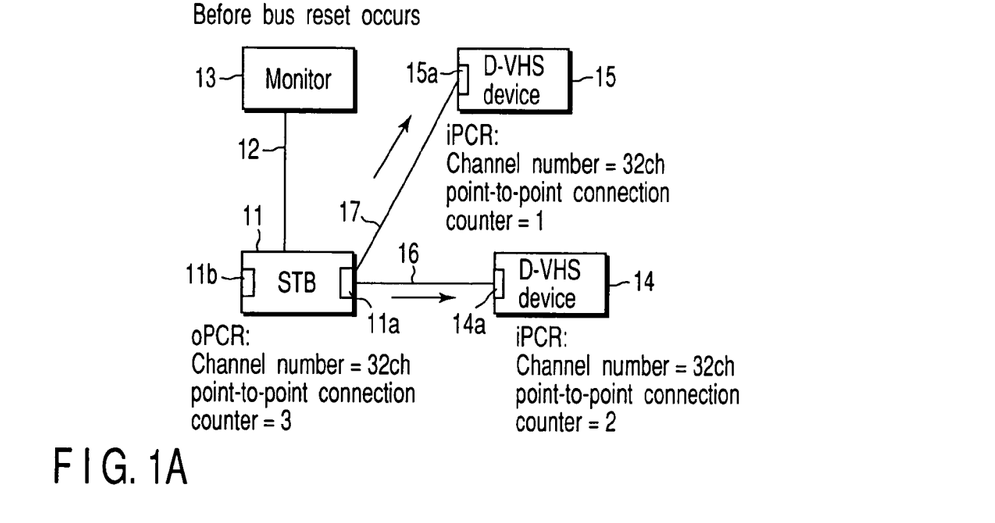
FIG. 1A to FIG. 1C are each block diagrams to explain a first embodiment of the present invention.

The first embodiment of the present invention will be described below with reference to the accompanying drawings. In FIG. 1A, a reference numeral 11 denotes an STB, which is connected to a monitor via analog AV cable 12. The STB 11 is provided with a digital interface section 11a conformable to IEEE 1394 standard.

Incidentally, as to the above digital interface section 11a, refer to "IEEE Standard for a High Performance Serial Bus" published by IEEE, "IEC6/883-1" published by IEC, etc.

The STB 11 is further provided with a control section 11b including a microcomputer, for collectively controlling the operation. Namely, the operation made by the STB 11 is all controlled by instructions from the control section 11b.

Several (two in FIG. 1) D-VHS devices 14 and 15 are individually connected to the STB 11 via serial buses 16 and 17, as recording/reproducing devices having digital interface sections 14a and 15a conformable to the IEEE 1394 standard. By doing so, a network system is built up.

The STB 11 sends control data to the serial buses 16 and 17 based on user's operation so that the D-VHS devices 14 and 15 connected to network system can be arbitrarily selected and controlled.

By doing so, the STB 11 transmits digital image data of received and demodulated programs to the arbitrarily selected D-VHS devices 14 and 15 via the serial buses 16 and 17 so that these D-VHS devices can record it.

Further, the STB 11 reads the recorded digital image data from the arbitrarily selected D-VHS devices 14 and 15, and inputs it via the serial buses 16 and 17 so that the monitor 13 can display the digital image data.

As shown in FIG. 1A, before bus reset occurs, the STB 11 outputs isochronous packet using channel number=32 ch so that the D-VHS devices 14 and 15 can input and record it.

Figure 1B:
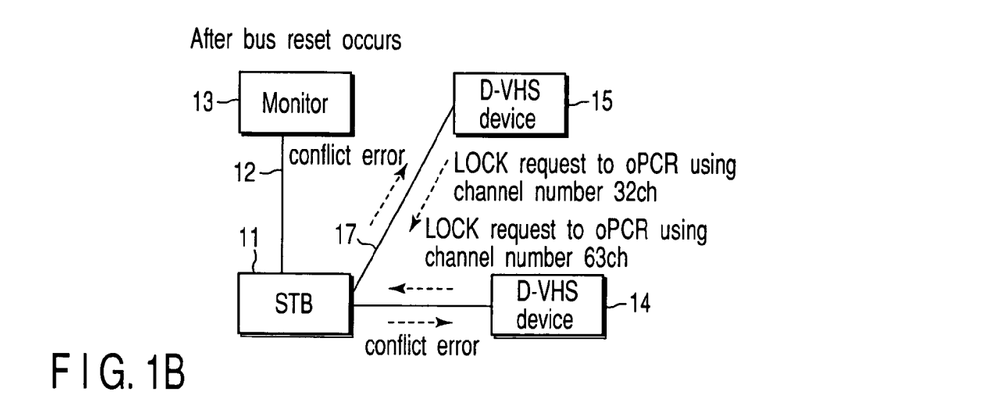

In this state, the bus may be reset. Further, before setting its oPCR to restore the connection, the STB 11 may make a LOCK request as shown in FIG. 1B so that the D-VHS 14 may send the isochronous packet to the oPCR of the STB 11 via channel 63 ch.

In this case, the STB 11 determines whether or not isoch_resource_delay time elapses, thereafter, inhibits the change of oPCR in order to preferentially perform the Restore, and returns a response of conflict error to the D-VHS device 14. By doing so, the D-VHS device 14 recognizes that the change fails.

Figure 1C:
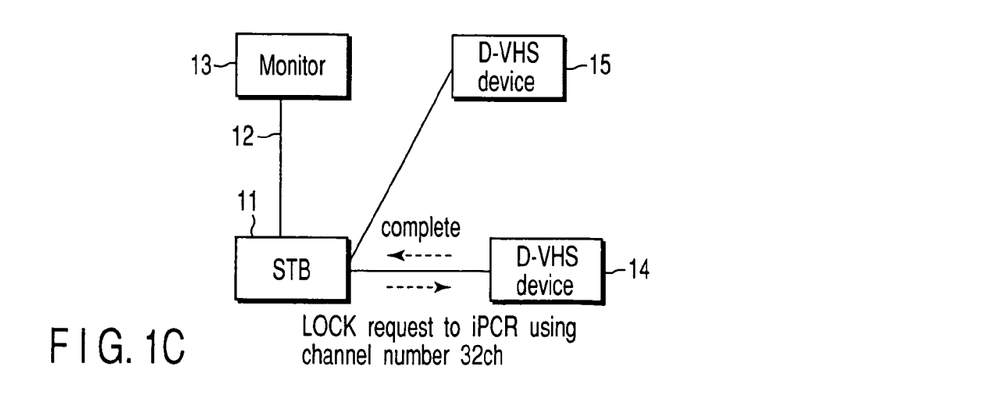

As shown in FIG. 1C, the STB 11 sets the self oPCR and the iPCR of the D-VHS device 14 to channel number=32 ch by the above restore, and sets up a point-to-point connection counter. By doing so, stream output for recording is continued.

Figure 2A:
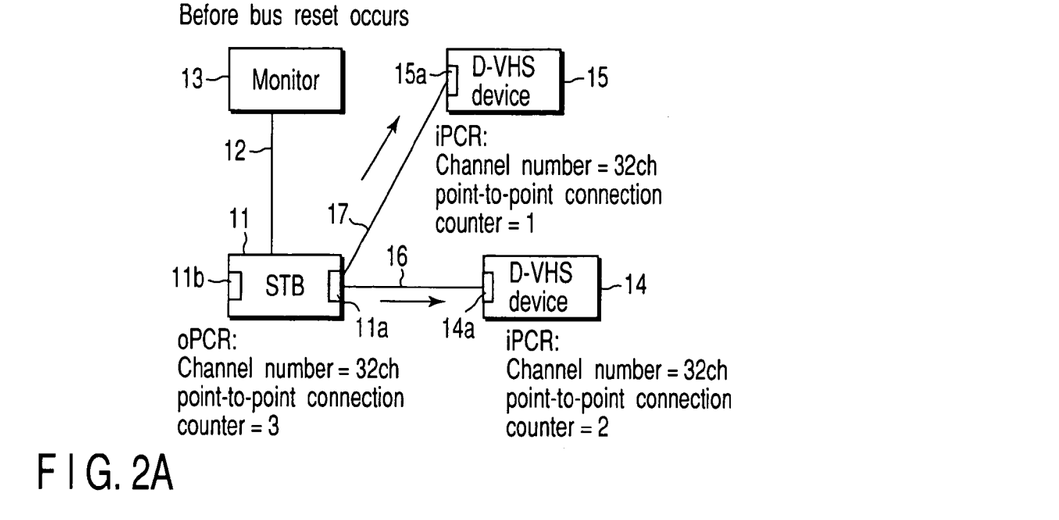
FIG. 2A to FIG. 2C are each block diagrams to explain a second embodiment of the present invention.
Figure 2B:
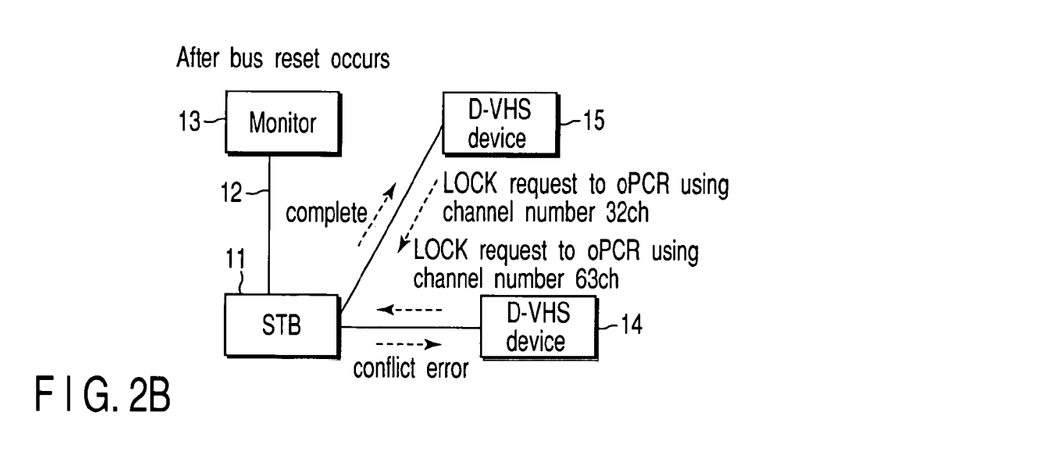
Figure 2C:
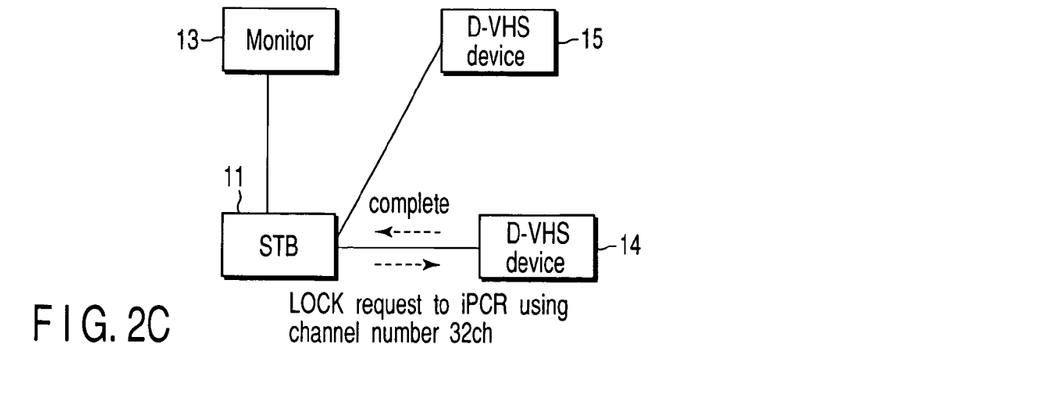

The second embodiment of the present invention will be described below. In FIG. 2A to FIG. 2C, the same reference numerals are used to designate the portions identical to FIG. 1A to FIG. 1C. First, as depicted in FIG. 2A, before bus reset occurs, the STB 11 outputs isochronous packet using channel number=32 ch so that the D-VHS 14 and 15 can input and record it.

In this state, the bus may be reset. Additionally, before setting its oPCR to restore the connection, the STB 11 may make a LOCK request as shown in FIG. 2B so that the D-VHS 14 may send the isochronous packet to the oPCR of the STB 11 via channel 63 ch.

In this case, the STB 11 inhibits the change of oPCR because the requested channel number is different from the channel number=32 ch stored before bus reset occurs, and returns a response of conflict error to the D-VHS device 14. By doing so, the D-VHS device 14 recognizes that the change fails.

As shown in FIG. 2C, the STB 11 sets the self oPCR and the iPCR of the D-VHS device 14 to channel number=32 ch by the above restore, and also, sets up the above point-to-point connection counter. By doing so, stream output for recording is continued.

Figure 3A:
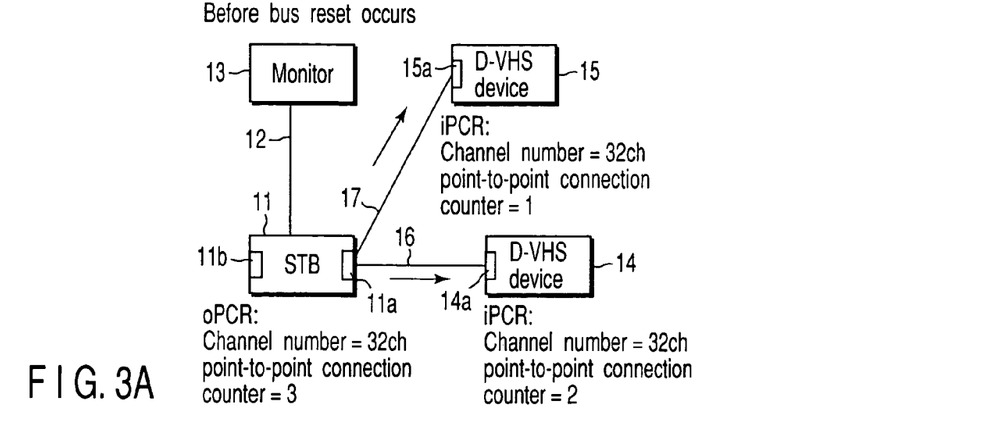
FIG. 3A to FIG. 3C are each block diagrams to explain a third embodiment of the present invention.
Figure 3B:
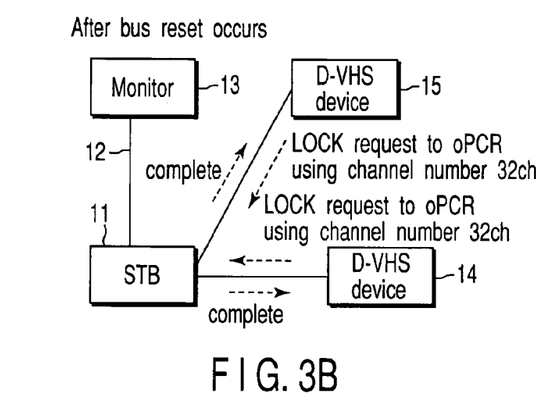
Figure 3C:
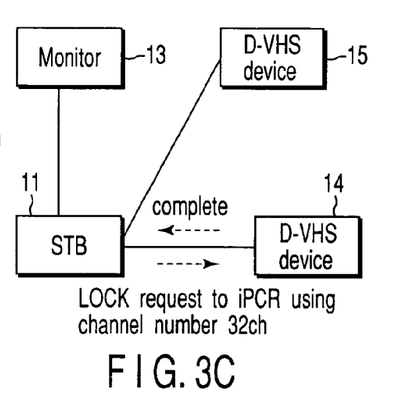

The third embodiment of the present invention will be described below. In FIG. 3A to FIG. 3C, the same reference numerals are used to designate the portions identical to FIG. 1A to FIG. 1C. First, as depicted in FIG. 3A, before bus reset occurs, the STB 11 outputs isochronous packet using channel number=32 ch so that the D-VHS 14 and 15 can input and record it.

In this state, the bus may be reset. Moreover, before setting its oPCR to restore the connection, the STB 11 may make a LOCK request as shown in FIG. 3B so that the D-VHS 14 may send the isochronous packet to the oPCR of the STB 11 via channel 32 ch.

In this case, the STB 11 permits the change of oPCR because the requested channel number is the same as the channel number=32 ch stored before bus reset occurs, and returns a response of complete to the D-VHS device 14. By doing so, the D-VHS device 14 recognizes that the change succeeds.

Thereafter, the STB 11 sets the self-oPCR by the above restore, but connection restore fails because the point-to-point connection counter has been already connected. In this case, however, as seen from FIG. 3C, isochronous packet output for recording is continued. After isoch_resource_delay time elapses, overlay connection is made.

Figure 4A:
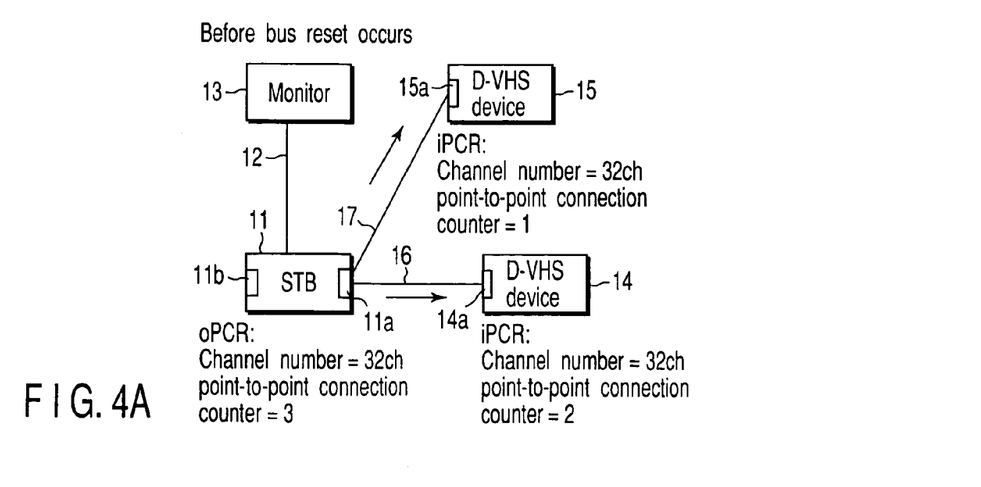
FIG. 4A to FIG. 4D are each block diagrams to explain a fourth embodiment of the present invention.
Figure 4B:
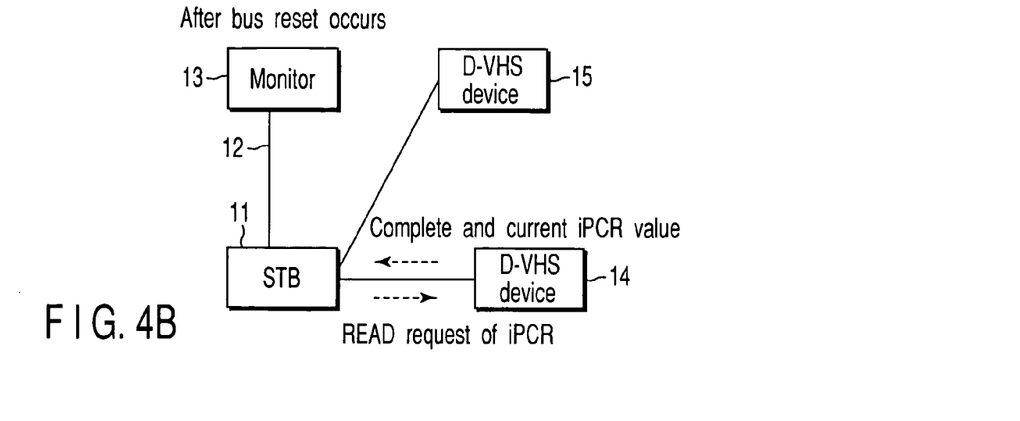
Figure 4C:
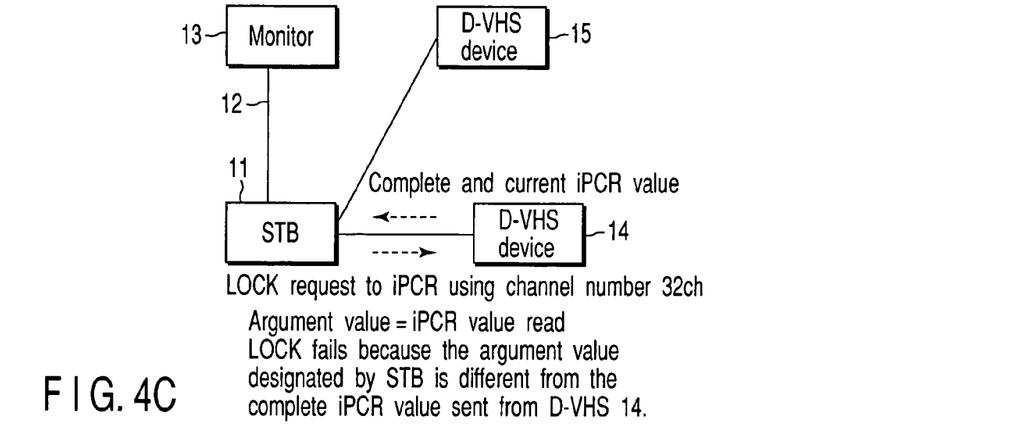

The fourth embodiment of the present invention will be described below. In FIG. 4A to FIG. 4C, the same reference numerals are used to designate the portions identical to FIG. 1A to FIG. 1C. First, as depicted in FIG. 4A, before bus reset occurs, the STB 11 outputs isochronous packet using channel number=32 ch so that the D-VHS 14 and 15 can input and record it.

In this state, the bus may be reset. Additionally, before setting its oPCR to restore the connection, the STB 11 may make a LOCK request as shown in FIG. 4B so that the D-VHS 14 may send the isochronous packet to the oPCR of the STB 11 via channel 32 ch. Further, after the bus is reset, the STB 11 may read iPCR and set the same as an argument value before making a Lock request to the iPCR of the D-VHS 14, in order to restore the connection.

In this case, the iPCR value excessively changes in the D-VHS device 14; for this reason, LOCK fails because of comparative value error, as seen from FIG. 4C.

Figure 4D:
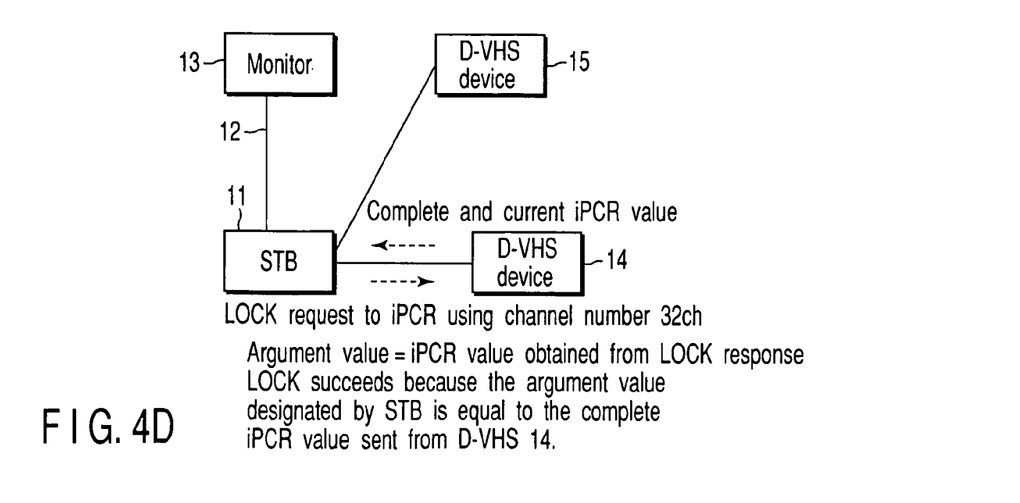

Thereafter, as shown in FIG. 4D, LOCK is retried using the latest iPCR value of the D-VHS device 14 acquired by the LOCK response. If the LOCK succeeds, stream output for recording is continued.

Figure 5:
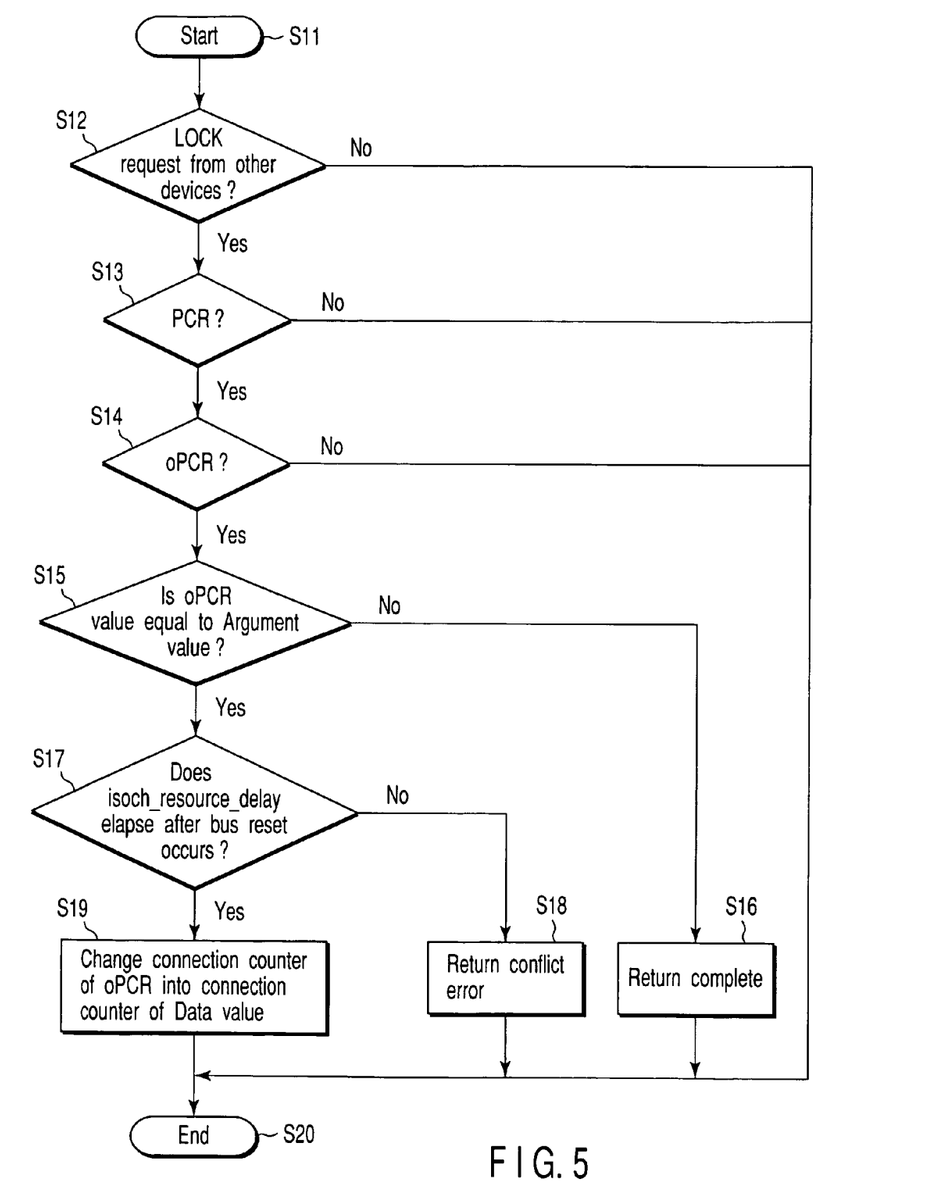
FIG. 5 is a flowchart to explain the operation when a LOCK request is made with respect to oPCR of STB from other devices.

FIG. 5 is a flowchart showing the operation when a LOCK request is made with respect to the oPCR of the STB 11 from other devices. First, when the procedure is started (step S11), the STB 11 determines whether or not a LOCK request is made from other devices in step S12. If it is determined that there is no LOCK request (NO), the procedure ends (step S20).

In step S12, if it is determined that there is a LOCK request (YES), the STB 11 determines whether or not the LOCK request is made with respect to the PCR in step S13. If it is determined that the LOCK request with respect to the PCR is not made (NO), the procedure ends (step S20).

In step S13, if it is determined that the LOCK request with respect to the PCR is made (YES), the STB 11 determines whether the LOCK request is made with respect to the oPCR in step S14. If it is determined that the LOCK request with respect to the oPCR is not made (NO), the procedure ends (step S20).

In step S14, if it is determined that the LOCK request with respect to the oPCR is made (YES), the STB 11 determines whether or not the oPCR value is equal to argument value in step S15. If it is determined that the oPCR value is not equal to the argument value (NO), the STB 11 returns the response of complete in step S16, and the procedure ends (step S20).

In step S15, if it is determined that the oPCR value is equal to the argument value (YES), the STB 11 determines whether or not isoch_resource_delay time elapses after bus reset occurs in step S17. If it is determined that the isoch_resource_delay time does not elapse (NO), the STB 11 returns the response of conflict error in step S18, and the procedure ends (step S20).

In step S17, if it is determined that the isoch_resource_delay time elapses after bus reset occurs (YES), the STB 11 updates the point-to-point connection counter of the oPCR into a point-to-point connection counter of data value in step S19, and the procedure ends (step S20).

Figure 6:
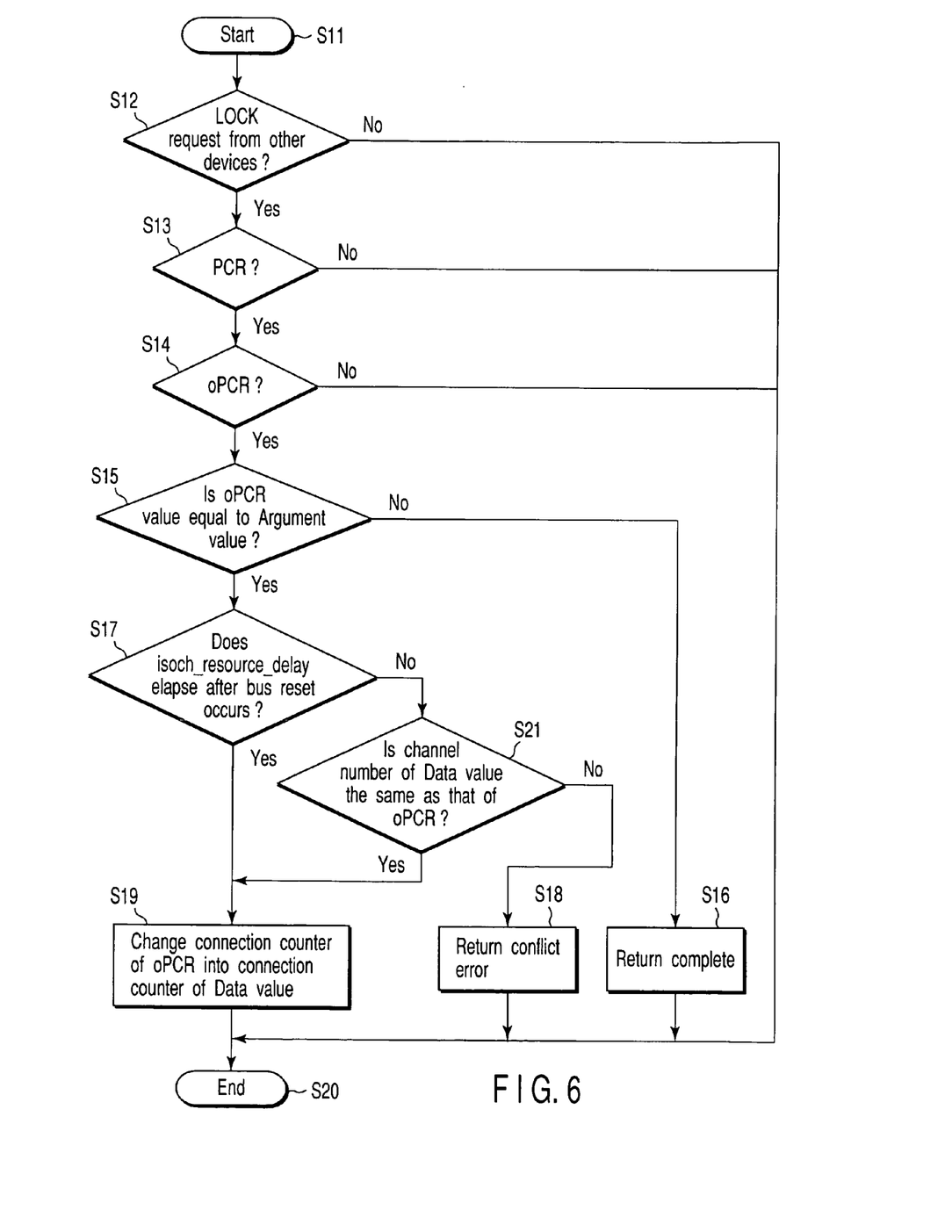
FIG. 6 is a flowchart to explain another operation when a LOCK request is made with respect to oPCR of STB from other devices.

FIG. 6 is a flowchart showing the operation when a LOCK request is made with respect to the oPCR of the STB 11 from other devices. In FIG. 6, the same reference numerals are used to designate the steps identical to FIG. 5.

In step S17, if it is determined that the isoch_resource_delay time does not elapse (NO), the STB 11 determines whether or not the channel number of the data value is the same as that of the oPCR (step S21). If it is determined that the channel number of the data value is not the same as that of the oPCR (NO), the sequence is transferred to the processing of step S18. If it is determined that the channel number of the data value is the same as that of the oPCR (YES), the sequence is transferred to the processing of step S19.

Figure 7:
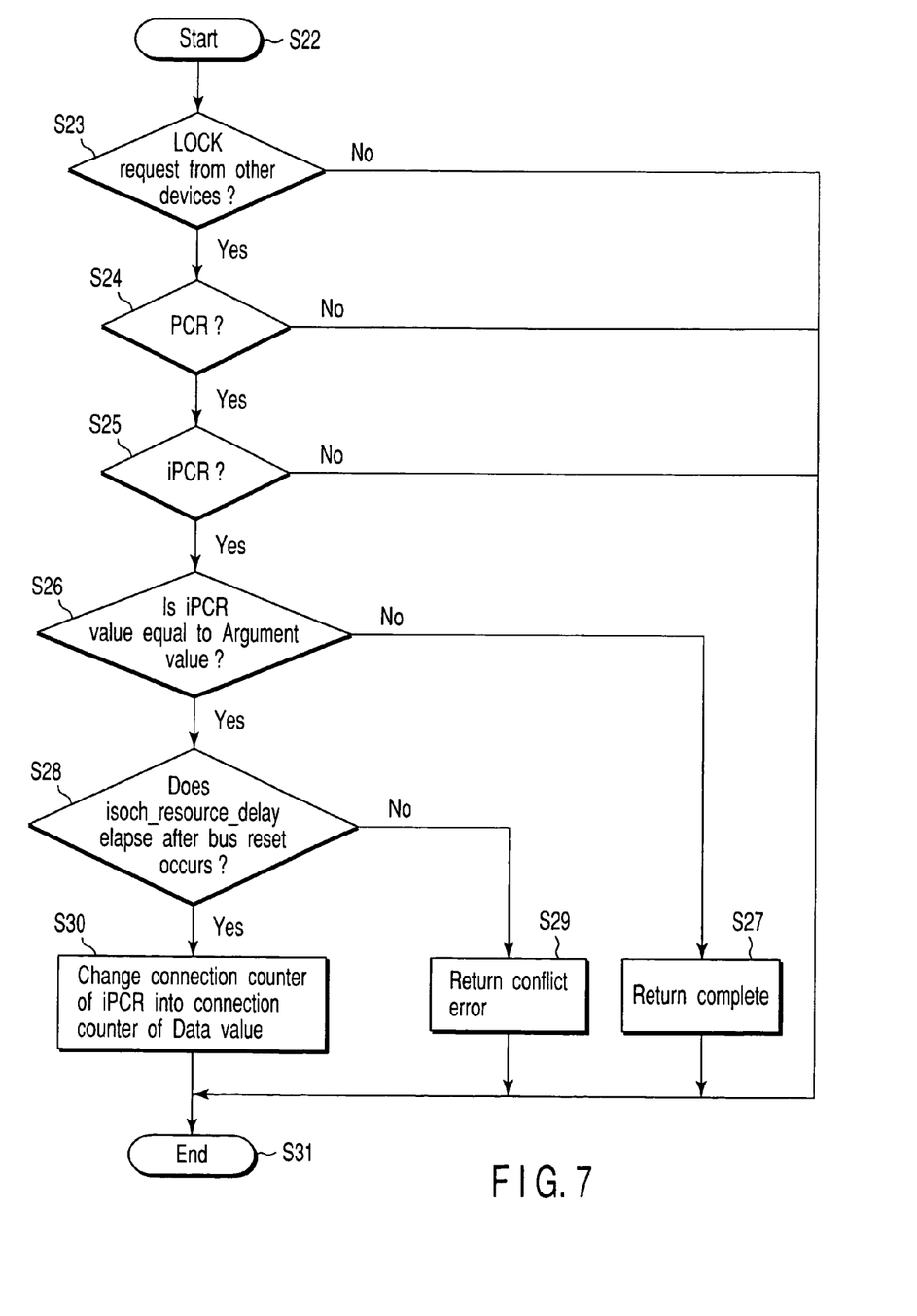
FIG. 7 is a flowchart to explain the operation when a LOCK request is made with respect to iPCR of STB from other devices.

FIG. 7 is a flowchart showing the operation when a LOCK request is made with respect to the iPCR of the STB 11 from other devices. First, when the procedure is started (step S22), the STB 11 determines whether or not a LOCK request is made from other devices in step S23. If it is determined that there is no LOCK request (NO), the procedure ends (step S31).

In step S23, if it is determined that there is a LOCK request (YES), the STB 11 determines whether or not the LOCK request is made with respect to the PCR in step S24.

If it is determined that the LOCK request with respect to the PCR is not made (NO), the procedure ends (step S31).

In step S24, if it is determined that the LOCK request with respect to the PCR is made (YES), the STB 11 determines whether the LOCK request is made with respect to the iPCR in step S25. If it is determined that the LOCK request with respect to the iPCR is not made (NO), the procedure ends (step S31).

In step S25, if it is determined that the LOCK request with respect to the iPCR is made (YES), the STB 11 determines whether or not the iPCR value is equal to argument value in step S26. If it is determined that the iPCR value is not equal to the argument value (NO), the STB 11 returns the response of complete in step S27, and the procedure ends (step S31).

In step S26, if it is determined that the iPCR value is equal to the argument value (YES), the STB 11 determines whether or not isoch_resource_delay time elapses after bus reset occurs in step S28. If it is determined that the isoch_resource_delay time does not elapse (NO), the STB 11 returns the response of conflict error in step S29, and the procedure ends (step S31).

In step S28, if it is determined that the isoch_resource_delay time elapses after bus reset occurs (YES), the STB 11 updates the point-to-point connection counter of the iPCR into a point-to-point connection counter of data value instep S30, and the procedure ends (step S31).

Figure 8:
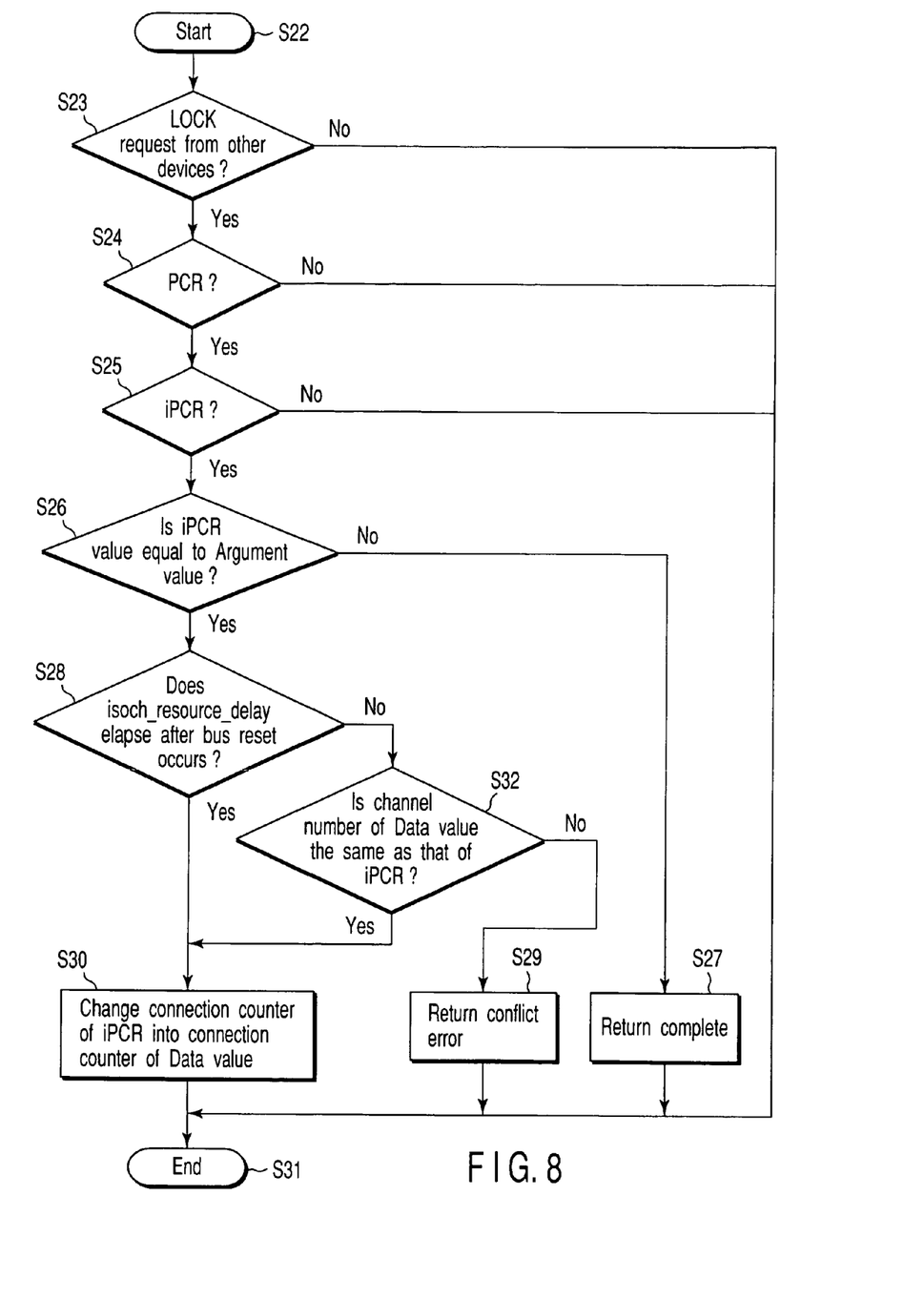
FIG. 8 is a flowchart to explain another operation when a LOCK request is made with respect to iPCR of STB from other devices.
Figure 9A:
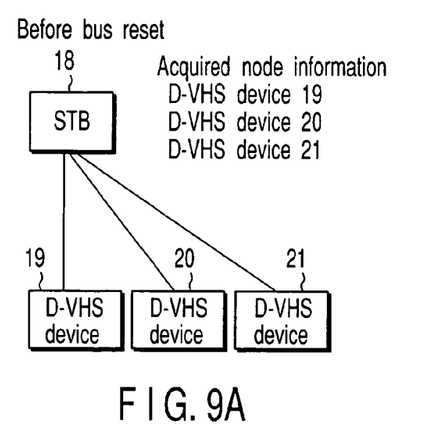
FIG. 9A to FIG. 9D are each views to explain the process for acquiring node information.
Figure 9B:
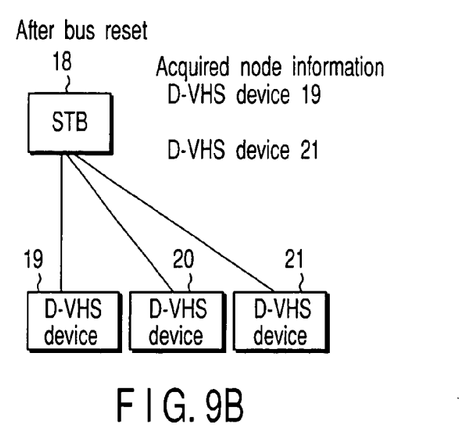
Figure 9C:
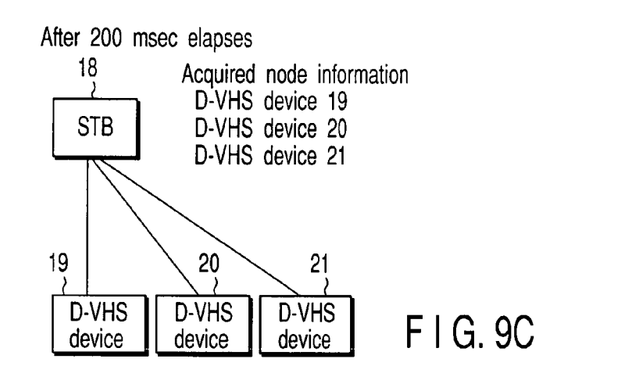
Figure 9D:
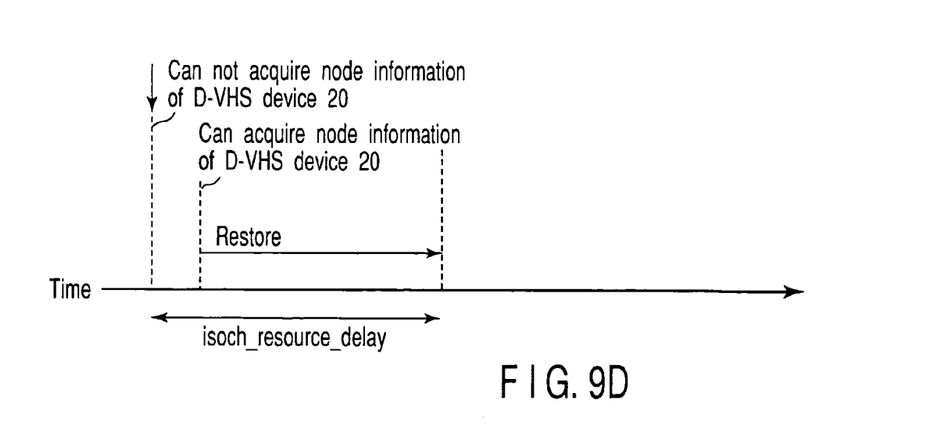
Figure 10A:
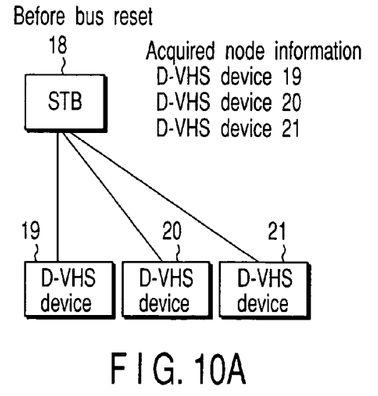
FIG. 10A to FIG. 10D are each views to explain another process for acquiring node information.
Figure 10B:
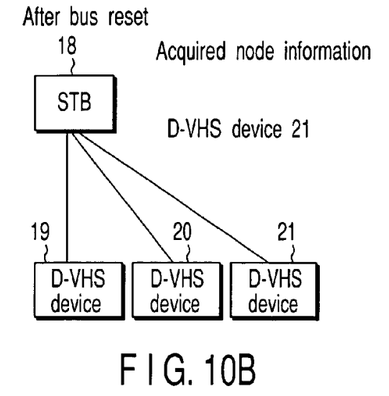
Figure 10C:
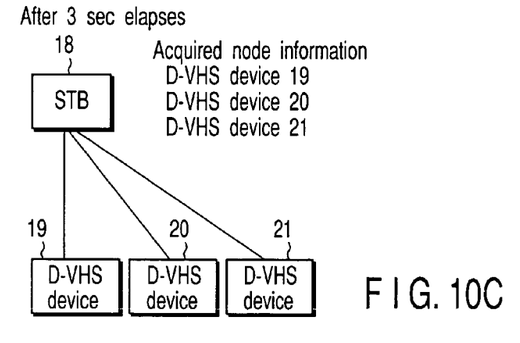
Figure 10D:
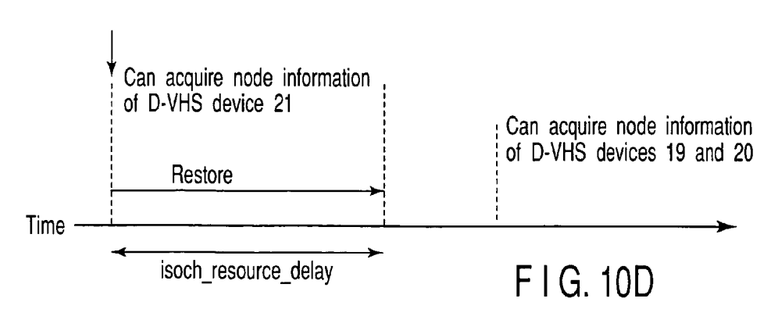

FIG. 8 is a flowchart showing the operation when a LOCK request is made with respect to the iPCR of the STB 11 from other devices. In FIG. 8, the same reference numerals are used to designate the steps identical to FIG. 7.

In step S28, if it is determined that the isoch_resource_delay time does not elapse (NO), the STB 11 determines whether or not the channel number of the data value is the same as that of the iPCR (step S32). If it is determined that the channel number of the data value is not the same as that of the iPCR (NO), the sequence is transferred to the processing of step S29. If it is determined that the channel number of the data value is the same as that of the iPCR (YES), the sequence is transferred to the processing of step S30.

After the bus reset occurs, node information of all devices connected to the network is not always acquired at once. As the case may be, there is a possibility that node information of devices, which will exist on the network, is not acquired. In such a case, it has been conventionally determined that no restore object device exists; therefore, restore fails.

As seen from FIG. 9A to FIG. 9D, the time defined by isoch_resource_delay is set so that the restore can be performed until necessary node information is acquired.

In FIG. 9A to FIG. 9D, before bus reset, an STB 18 acquires node information from three D-VHS devices 19, to 21. After the bus reset, the STB 18 acquires node information from two D-VHS devices 19 and 21, and acquires the node information of the D-VHS device 20 after 200 msec elapse, and thereafter, performs restore.

As shown in FIG. 10A to FIG. 10D, in order to acquire the node information, the node required for the restore may be preferentially collected. That is, in FIG. 10A to FIG. 10D, before bus reset, the STB 18 acquires node information from three D-VHS devices 19, to 21. After the bus reset, the STB 18 acquires node information from one D-VHS device 21, and performs restore. After 3 msec elapse, the STB 18 acquires the node information of the D-VHS devices 19 and 20.

Figure 11:
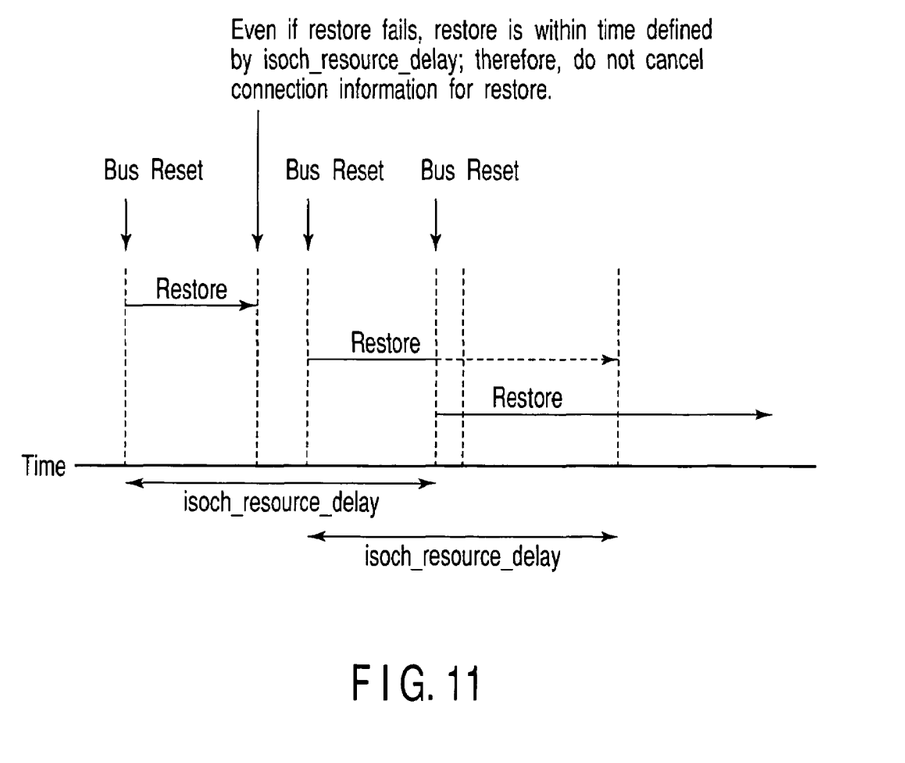
FIG. 11 is a chart to explain the procedure when bus reset occurs several times.

As seen from FIG. 11, even if bus reset occurs several times, it is necessary to hold connection information required for restore until the restore is completed. By doing so, a chance to perform the restore increases even if bus reset occurs several times.

In the above embodiments, IEEE 1394 network has been described. In order to continue intermittent transmission, the present invention may be applicable to the case where network connection state changes due to problems in the following network devices. One is the network device (in particular, AV related device), which is relevant to stream transmission requiring time continuity typified by MPEG-TS used for digital broadcasting. Another is a network device, which has a transmission system securing and using resources on a network, such as available bandwidth and logical channel when using the network.

In the present invention, transmission resource before bus reset is continuously used as much as possible. Thus, connection by new resource from the partner is rejected. In this case, the STB rejects the above connection in the following manner.

(1) Return conflict error with respect to connection request command.

(2) Do not make a response to connection request command. Or, make a response after 1000 msec or more are intentionally delayed, and thereby, it is possible to make invalid the connection request command.

(3) Show connection request command as if the factor is always different so as not to complete the connection request command.

Connection request from other devices is rejected for the following time periods:

(1) The period indicated as isoch_resource_delay;

(2) The period until the STB itself succeeds connection restore. This period falls within isoch_resource_delay; and (3) The period until new connection is made even if the STB fails to restore the connection. This rejection period is inevitably longer than Isoch resource_delay, because the connection can be restored after the period, Isoch_resource_delay. Nonetheless, the long rejection period makes it possible to secure a desirable logical channel (a continuous channel).

Conditions of rejecting connection request from other devices are as follows.

(1) Always reject connection request.

(2) Permit connection request if the connection request has the same condition as the resource to be continued. In IEEE 1394, the above condition (2) is equivalent to the case where the logical channel is the same.

The connection may be restored once the partner is confirmed, even if all node information is not acquired after the bus is reset. In this case, the connection is restored quickly.

As for node information, it is necessary to again confirm partner devices by the number of connected nodes. When the number of connected nodes increases, processing from other nodes conflicts; as a result, no response is obtained. In such a case, processing for acquiring node information is repeated. For hits reason, busy nodes must have many retries until information acquisition is completed; as a result, information acquisition is slow.

For this reason, a node incapable of acquiring node information makes no retry, and makes access to all nodes. Thereafter, the node having no information repeats node information acquisition. If the partner device is confirmed by only first-time node information, connection restore is possible unless all node information is acquired. In IEEE 1394, if only node number and node GUID (unique ID for each device) is confirmed, connection restore is possible.

Of course, connection restore may be performed after node information is confirmed, as usual.

What is claimed is:

1. An AV device comprising:
a digital interface section configured to establish a connection with a network; and
a control section configured to restore the connection with the network when a connection state of the network changes,
wherein if a second AV device, which was in communication with the AV device before the network connection state change, conflicts with said AV device, the control section rejects a connection request initiated by said second AV device and restores the AV devices, and
wherein the digital interface section is compliant with IEEE 1394 standard, and the control section rejects a PCR LOCK request given from the outside via the network within a time defined by isoch resource delay after the network connection state change and bus reset occurs.

2. An AV device according to claim 1, wherein the control section permits a connection request having the same condition as before the network connection state change.

3. An AV device according to claim 1, wherein the control section returns information indicative of rejecting the connection request to the network.

4. An AV device according to claim 1, wherein the control section rejects the connection request until the network connection state is restored.

5. An AV device according to claim 1, wherein the control section rejects the connection request until the connection restore of the network fails, and new a connection restore is executed.

6. An AV device according to claim 1, wherein the AV device is a receiver configured to receive digital broadcasts.

7. A method of controlling AV devices, comprising:
controlling AV devices connected to a network via a digital interface; and
restoring a connection with the network when a connection state of the network changes,
wherein if a second AV device, which was in communication with said AV device before the network connection state change, conflicts with said AV device, rejecting a connection request initiated by the second AV device and restoring the AV device, and
wherein the AV devices are connected to a network via a digital interface compliant with IEEE 1394 standard, and control is executed with respect to the AV devices so as to reject a PCR LOCK request given from the outside via the network within a time defined by isoch resource delay after the network connection state change and bus reset occurs.

8. A method according to claim 7, wherein the controlling of AV devices is executed so as to permit a connection request having the same condition as before the network connection state change.

9. A method according to claim 7, wherein the controlling of AV devices is executed so as to return information indicative of rejecting the connection request to the network.

10. A method according to claim 7, wherein the controlling of AV devices is executed so as to reject the connection request until the network connection state is restored.

11. A method according to claim 7, wherein the controlling of AV devices is executed so as to reject the connection request until the connection restore of the network fails, and new connection restore is executed.

12. An AV device network system comprising:
a plurality of AV devices connected to a network via a digital interface; and
a first AV device, from among the plurality of AV devices, configured to restore a connection with the network when a connection state of the network changes,
wherein if a second AV device selected from among the plurality of AV devices was in communication with the first AV device before the network connection state change, conflicts with the first AV device, the first AV device rejects a connection request initiated by the second AV device and restores the connection that existed before the network connection state change, and
wherein the plurality of AV devices are connected to the network via the digital interface that is compliant with IEEE 1394 standard, and control is executed with respect to the plurality of AV devices so as to reject a PCR LOCK request given from the outside via the network within a time defined by isoch resource delay after the network connection state change and bus reset occurs.

13. A system according to claim 12, wherein the first AV device permits a connection request having the same condition as before the network connection state change.

14. A system according to claim 12, wherein the first AV device returns information indicative of rejecting the connection request to the second AV device making the connection request via the network.

15. A system according to claim 12, wherein the first AV device rejects the connection request until the network connection state is restored.

16. A system according to claim 12, wherein the first AV device rejects the connection request until the connection restore of the network fails, and a new connection restore is executed.

* * * * *